(12) United States Patent
Oshino et al.

(10) Patent No.: US 10,987,585 B2
(45) Date of Patent: *Apr. 27, 2021

(54) STORAGE MEDIUM, INFORMATION-PROCESSING DEVICE, INFORMATION-PROCESSING SYSTEM, AND INFORMATION PROCESSING METHOD

(71) Applicant: NINTENDO CO., LTD., Kyoto (JP)

(72) Inventors: Yosuke Oshino, Kyoto (JP); Fumiya Nakano, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,931

(22) Filed: Sep. 17, 2019

(65) Prior Publication Data
US 2020/0246703 A1 Aug. 6, 2020

(30) Foreign Application Priority Data
Feb. 1, 2019 (JP) ................ JP2019-17055

(51) Int. Cl.
*A63F 13/57* (2014.01)
(52) U.S. Cl.
CPC .................... *A63F 13/57* (2014.09)
(58) Field of Classification Search
None
See application file for complete search history.

(56) References Cited

U.S. PATENT DOCUMENTS

| | | | |
|---|---|---|---|
| 2012/0302339 A1* | 11/2012 | Kimura | A63F 13/60 463/31 |
| 2018/0093187 A1* | 4/2018 | Mabuchi | A63F 13/216 |
| 2018/0093188 A1* | 4/2018 | Mabuchi | A63F 13/822 |
| 2019/0043312 A1* | 2/2019 | Ito | G07F 17/3211 |
| 2019/0336863 A1* | 11/2019 | Hayashi | A63F 13/2145 |
| 2020/0306649 A1* | 10/2020 | Aita | A63F 13/46 |

OTHER PUBLICATIONS

Nintendo [Online], "Super Mario Maker", https://www.nintendo.co.jp/wiiu/amaj/guide/index/html> and its English counterpart, 31 pages.

* cited by examiner

*Primary Examiner* — Seng H Lim
(74) *Attorney, Agent, or Firm* — Nixon & Vanderhye PC

(57) ABSTRACT

A game system provides a virtual game space in which plural players play a game. In the virtual game space, if a player object performs a first action on an item appearance area, the game system determines whether a right state of the player object is a first state or a second state, and whether an area state of the item appearance area is a first area state or a second area state. If the right state of the player object is the first state and the area state is the first area state, the game system determines that an item appearance condition is satisfied. If the right state of the player object is the second state or the area state is the second area state, the game system determines that the item appearance condition is not satisfied. If it is determined that the item appearance condition is satisfied, the game system causes a game item to appear in the virtual game space, and changes the right state of the player object to the second state. The area state changes to the first area state if the game item becomes unattainable by player objects.

20 Claims, 12 Drawing Sheets

| ITEM APPEARANCE AREA | PLAYER P1 | PLAYER P2 | PLAYER P3 | PLAYER P4 |
|---|---|---|---|---|
| A1 | false | true | true | — |
| A2 | true | true | true | — |
| ⋮ | ⋮ | ⋮ | ⋮ | ⋮ |

| ITEM | ITEM APPEARANCE AREA | PLAYER | HOLDER |
|---|---|---|---|
| T1 | A1 | P1 | P2 |
| T2 | A2 | P2 | — |
| ⋮ | ⋮ | ⋮ | ⋮ |

STORAGE MEDIUM, INFORMATION-PROCESSING DEVICE, INFORMATION-PROCESSING SYSTEM, AND INFORMATION PROCESSING METHOD

CROSS REFERENCE TO RELATED APPLICATIONS

The disclosure of Japanese Patent Application No. 2019-17055, filed on Feb. 1, 2019, is incorporated herein by reference.

FIELD

An embodiment of the present invention relates to multi-play of a game.

BACKGROUND AND SUMMARY

There is known in the art a game in which a player can create and play a game course.

An embodiment of the present invention provides a non-transitory computer readable storage medium having stored therein an information processing program to be executable by one or more computer processors of an information processing apparatus, wherein the information processing program cases the one or more computer processors to execute: running a game played by players; arranging an item appearance area in a virtual game space of the game; upon detecting that a first player object performs a first action on the item appearance area, determining whether a right state of the first player object concerning appearance of a game item in the item appearance area is a first state or a second state, and whether an area state of the item appearance area is a first area state or a second area state; upon determining that the right state is the first state and the area state is the first area state, determining that an item appearance condition is satisfied; upon determining that the right state is the second state or the area state is the second area state, determining that an item appearance condition is not satisfied; upon determining that the item appearance condition is satisfied, causing the game item to appear in the virtual game space; upon detecting the first action performed by the first player object on the item appearance area or a second action performed by the first player object on the game item, changing the right state of the first player object for the item appearance area to the second state; and upon detecting that the game item becomes unattainable by player objects in an appearance determination area within the virtual game space, changing the area state to the first area state.

DETAILED DESCRIPTION OF NON-LIMITING EXAMPLE EMBODIMENTS

1. Embodiment 1-1. Configuration

A communication system according to an embodiment of the present invention will be described with reference to the drawings.

Figure 1:
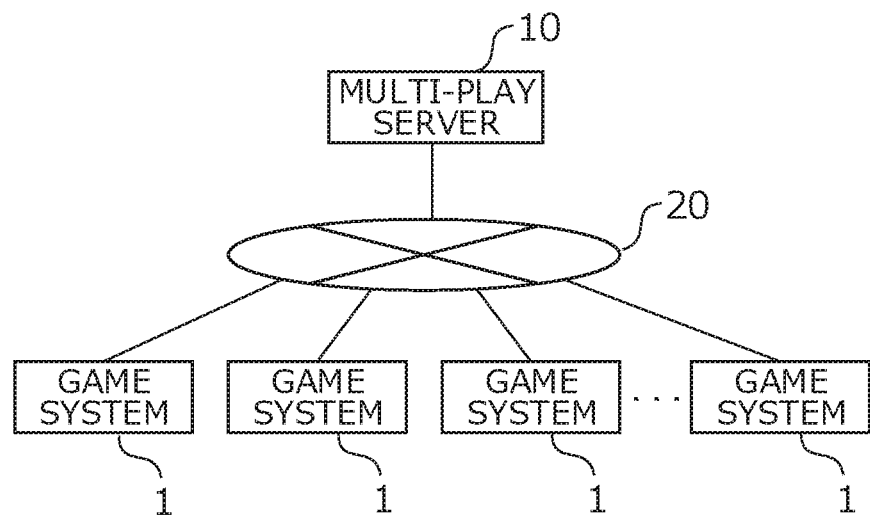
FIG. 1 is a diagram showing an example of a configuration of a communication system.

FIG. 1 is a block diagram showing an example of a configuration of the communication system. The communication system shown in the drawing includes plural game systems 1 and multi-play server 10, which are connected by communication network 20 such as the Internet or a LAN so that they can communicate with each other. A player of game system 1 performs a multi-play with another player who is matched with the player by multi-play server 10, or another player who is selected by the player. The term multi-play as used herein refers to a situation in which multiple players play a game in a game space. Below, game system 1 will be described in detail.

Figure 2:
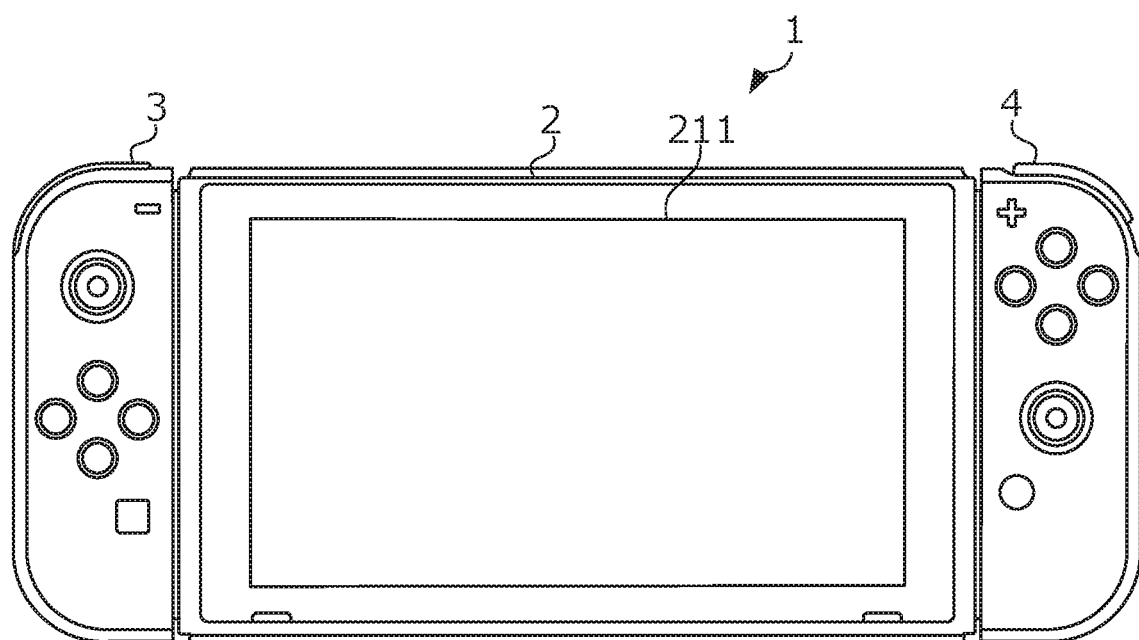
FIG. 2 is a diagram showing an example of an appearance of game system 1.

FIG. 2 is a diagram showing an example of an appearance of game system 1. As shown in the drawing, game system 1 includes main device 2, left controller 3, and right controller 4. Left controller 3 and right controller 4, which may hereinafter be collectively referred to as "controller," can be attached to and detached from main device 2. Gamey system 1 can be used either in a state in which left controller 3 and right controller 4 are attached to main device 2 or in another state in which left controller 3 and right controller 4 are detached from main device 2.

Figure 3:
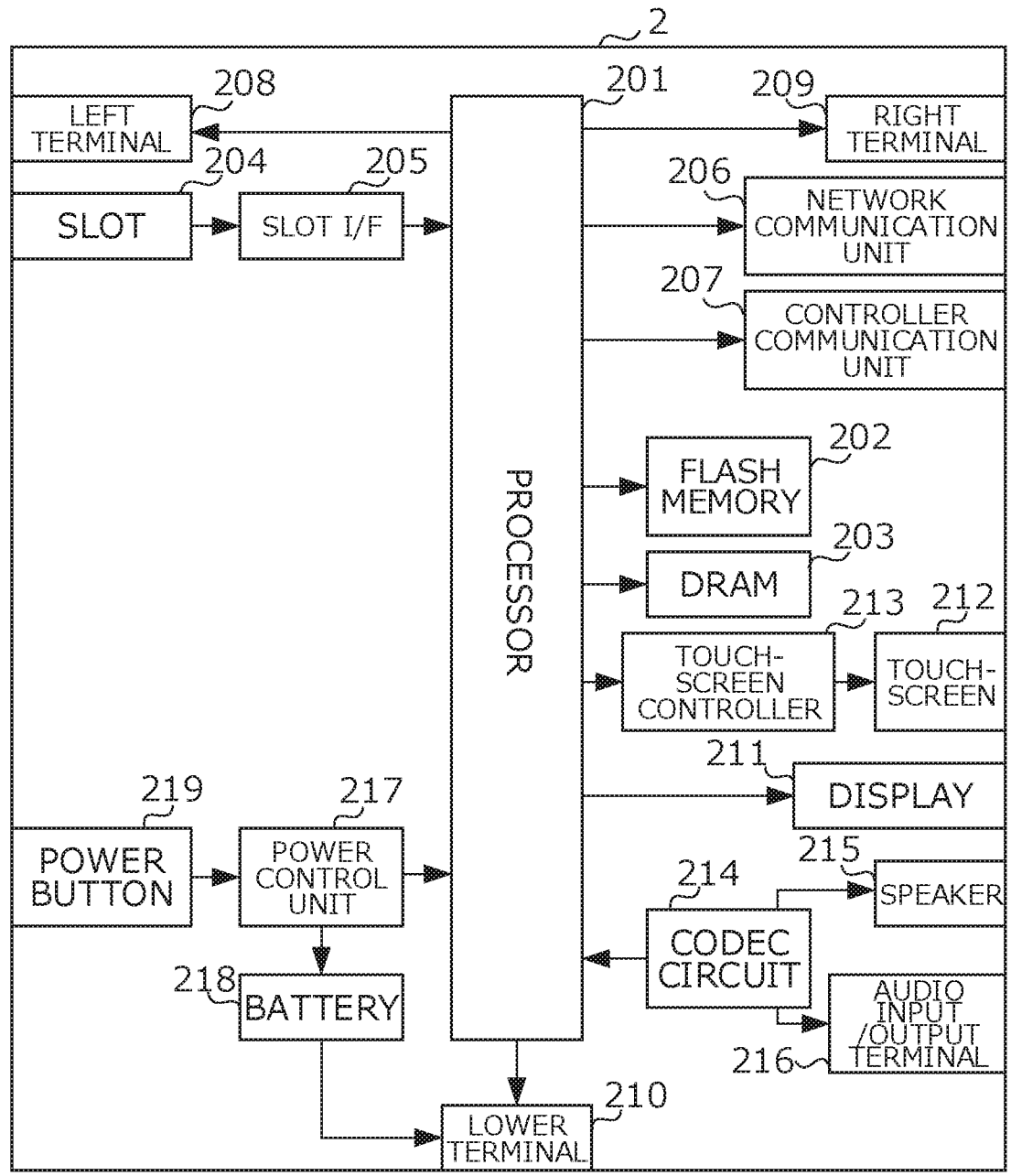
FIG. 3 is a block diagram showing an example of an internal configuration of main device 2.

FIG. 3 is a block diagram showing an example of an internal configuration of main device 2. As shown in the drawing, main device 2 includes processor 201, which is an information-processing unit for carrying out various types of information processing. Processor 201 may include only a central processing unit (CPU), or it may include a System-on-a-chip (SoC) having plural functions such as a CPU function or a graphics processing unit (GPU) function. Processor 201 may execute a program stored in an internal storage medium or an external storage medium inserted into slot 204, thereby carrying out various types of information processing.

Main device 2 also includes flash memory 202 and dynamic random access memory (DRAM) 203 as an example of an internal storage medium. Flash memory 202 is a non-volatile memory for storing various types of data, and DRAM 203 is a volatile memory for temporarily storing various types of data.

Main device 2 also includes slot 204 and slot interface (hereinafter abbreviated to "I/F") 205. Slot 204 is provided on the upper side of the housing of main device 2 and is shaped such that an external storage medium such as a memory card may be inserted thereinto. Slot I/F 205 may read and write data from and to an external storage medium inserted into slot 204 in accordance with instructions from processor 201.

Main device 2 also includes network communication unit 206 that may wirelessly communicate with an external device using a wireless LAN or infrared communication.

Main device 2 also includes controller communication unit 207 that may wirelessly communicate with left controller 3 and right controller 4 by use of a near field communication technique such as Bluetooth (registered trademark).

Main device 2 also includes left side terminal 208, right side terminal 209, and lower side terminal 210. Left side terminal 208 is a terminal for enabling main device 2 to perform wired communication with left controller 3. Right terminal 209 is a terminal for enabling main device 2 to perform wired communication with right controller 4. Lower terminal 210 is a terminal for enabling main device 2 to communicate with a cradle. While connected to the cradle, main device 2 can output images and sounds to an external stationary monitor via the cradle.

Main device 2 also includes display 211 that is a display device such as a liquid crystal display or an organic EL display.

Main device 2 also includes touch-screen 212 and touch-screen controller 213. Touch-screen 212 is, for example, a capacitive touch screen, which is layered on top of display 211, and touch-screen controller 213 is a circuit for controlling touch-screen 212. Touch-screen controller 213 may generate data indicative of a touched position based on a signal output from touch-screen 212, and output the data to processor 201.

Main device 2 also includes codec circuit 214, speaker 215, and audio input/output terminal 216. Codec circuit 214 is a circuit for controlling input and output of audio data to speaker 215 and audio input/output terminal 216.

Main device 2 also includes power control unit 217, battery 218, and power button 219. Power control unit 217 may control supply of power from battery 218 to components of main device 2 under control of processor 201.

Figure 4:
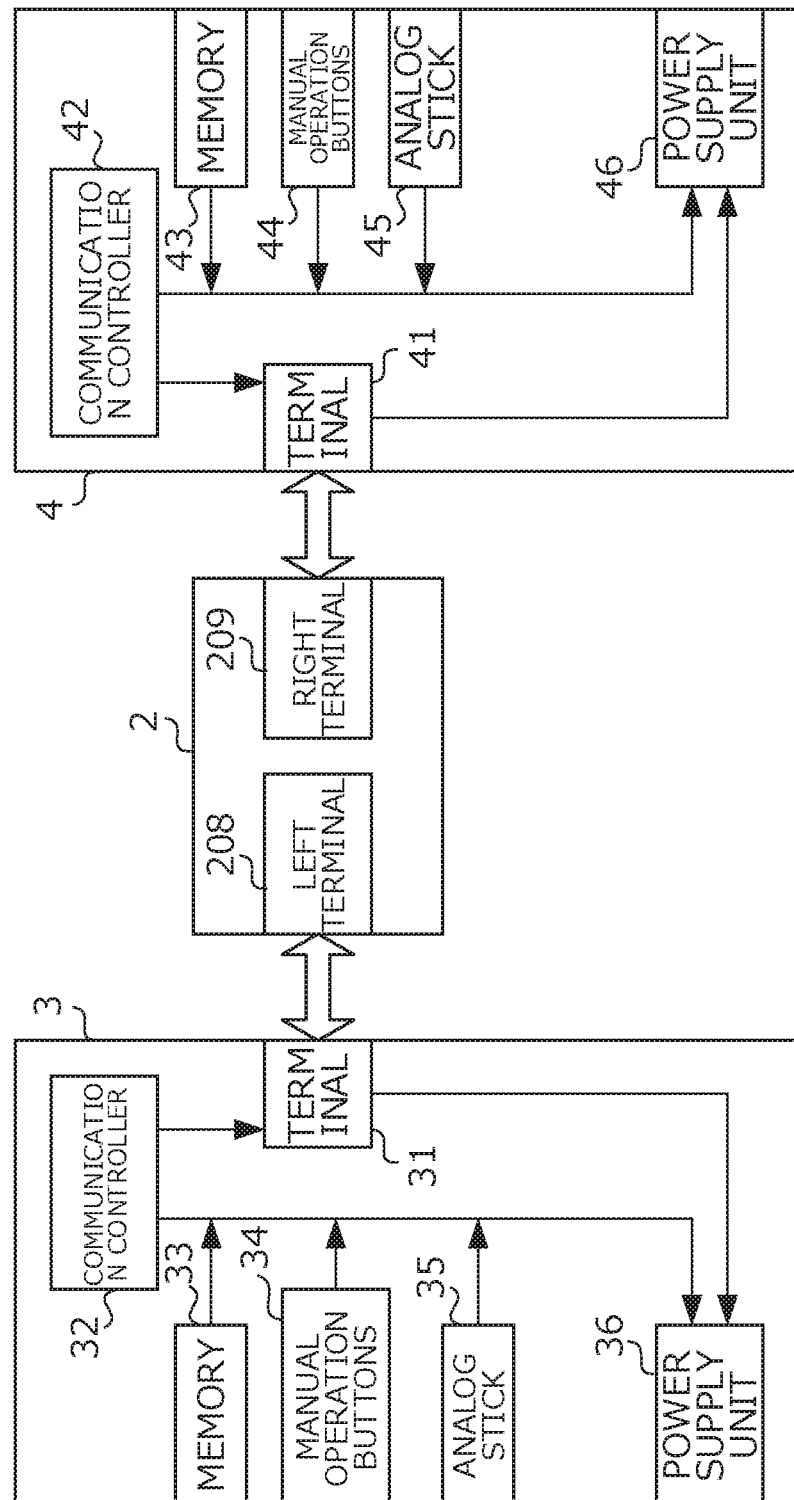
FIG. 4 is a block diagram showing an example of an internal configuration of left controller 3 and right controller 4.

FIG. 4 is a block diagram showing an example of an internal configuration of left controller 3 and right controller 4. As shown in the drawing, left controller 3 includes terminal 31 for enabling left controller 3 to perform wired communication with main device 2.

Left controller 3 includes communication controller 32 that includes a microprocessor and may control communication with main device 2. Communication controller 32 is capable of both wired communication via terminal 31 and wireless communication not via terminal 31 with main device 2. When left controller 3 is attached to main device 2, communication controller 32 performs wired communication with main device 2 via terminal 31, whereas when left controller 3 is not attached to main device 2, communication controller 32 performs wireless communication with main device 2.

Left controller 3 also includes memory 33 such as a flash memory. Communication controller 32 may execute firmware stored in memory 33 to carry out various types of processing.

Left controller 3 also includes various manual operation buttons 34 and analog stick 35, each of which may output manual operation data to communication controller 32. Communication controller 32 may send obtained manual operation data to main device 2.

Left Controller 3 also includes power supply unit 36 that includes a battery and a power control circuit.

Right controller 4 includes terminal 41 for enabling right controller 4 to perform wired communication with main device 2.

Right controller 4 includes communication controller 42 that includes a microprocessor and may control communication with main device 2. Communication controller 42 is capable of both wired communication via terminal 41 and wireless communication not via terminal 41 with main device 2. When right controller 4 is attached to main device 2, communication controller 42 performs wired communication with main device 2 via terminal 41, whereas when right controller 4 is not attached to main device 2, communication controller 42 performs wireless communication with main device 2.

Right controller 4 also includes memory 43 such as a flash memory. Communication controller 42 may execute firmware stored in memory 43 to carry out various types of processing.

Right controller 4 also includes various manual operation buttons 44 and analog stick 45, each of which may output manual operation data to communication controller 42. Communication controller 42 may send obtained manual operation data to main device 2.

Right controller 4 also includes power supply unit 46 that includes a battery and a power control circuit.

Figure 5:
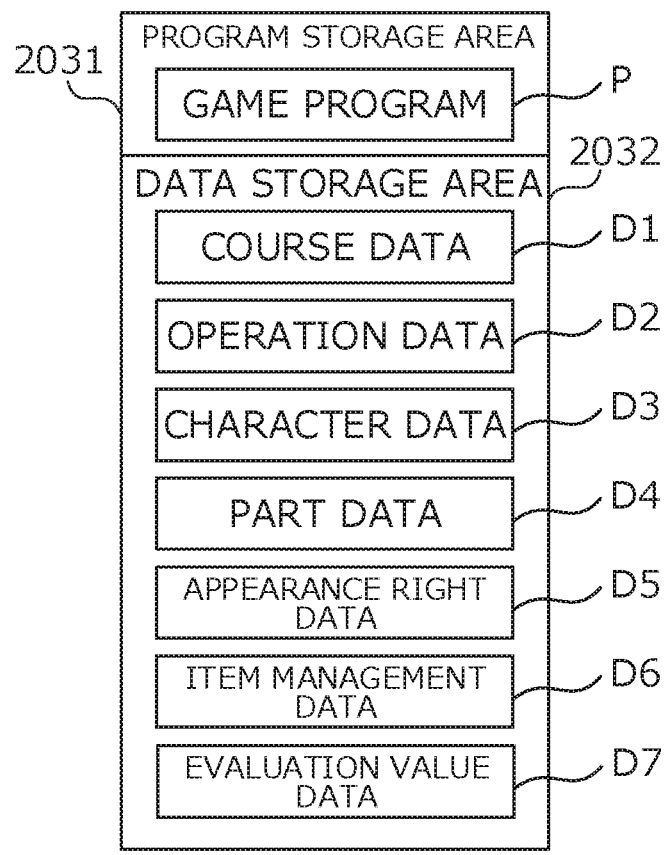
FIG. 5 is a diagram showing an example of a memory map of DRAM 203.
Figure 6:
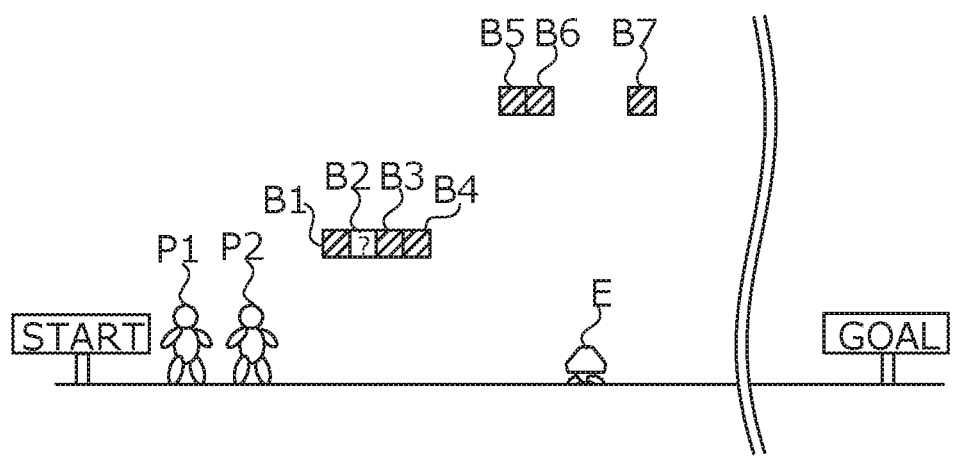
FIG. 6 is a diagram showing an example of a game course.

FIG. 5 is a diagram showing an example of a memory map of DRAM 203 described above. DRAM 203 shown in the drawing includes program storage area 2031 and data storage area 2032. Program storage area 2031 stores game program P that is a program of a multi-player game, which program is loaded from flash memory 202 or an external storage medium to program storage area 2031. Game program P may be distributed via a network such as the Internet or a non-transitory storage medium. Game program P provides a multi-player game in which plural players simultaneously play a variety of game courses, and each player obtains an evaluation value that increases or decreases depending on whether s/he has finished a game course. In each of the game courses, each player plays a two-dimensional horizontal-scrolling action game. FIG. 6 is a diagram showing an example of a game course of the action game. The object of the action game is to move a player character from the start point to the goal point. If a player has succeeded in moving his/her character to the goal point, the player finishes the game course.

Data storage area 2032 stores data for enabling a player to participate in a multi-player game. Specifically, data storage area 2032 stores course data D1, operation data D2, character data D3, part data D4, appearance right data D5, item management data D6, and evaluation value data D7.

Course data D1 is data indicative of an arrangement of parts in a game course. Course data D1 is, for example, created and uploaded to a server (not shown) by another player, and the uploaded course data is downloaded to game system 1 to be used therein. Parts in a game course indicated by course data D1 are roughly divided into blocks, items, enemy characters, and a landscape. Among them, blocks can include an item. When a character performs a predetermined action (e.g., a jump to hit the bottom of a block) on a block including an item, the item emerges from the block. The block including an item is an example of an item appearance area.

Items are roughly divided into power-up items, ride-on items, and special items. Among them, a power-up item is an item that gives a player character that has acquired the item increased strength, increased size, or an ability to fly in the sky, for example. When a player character acquires a power-up item, the power-up item, for example, disappears from the game course.

A ride-on item is an item that enables a player character that has ridden it to move in the air or to move unhindered by obstacles. The player character may get off the ride-on item whenever the item is not needed. When a player character rides a ride-on item, the ride-on item, for example, moves together with the player character, without disappearing from the game course.

Special items are divided into a block conversion switch and a shake item. Among them, the block conversion switch is an item that is activated when a character steps on it, and converts blocks in a game course into coins for a predetermined period of time. The shake item is an item that is activated when a character steps on it, and wipes out enemy characters on the screen.

The foregoing is a description of course data D1.

Figures 7, 8, 9:
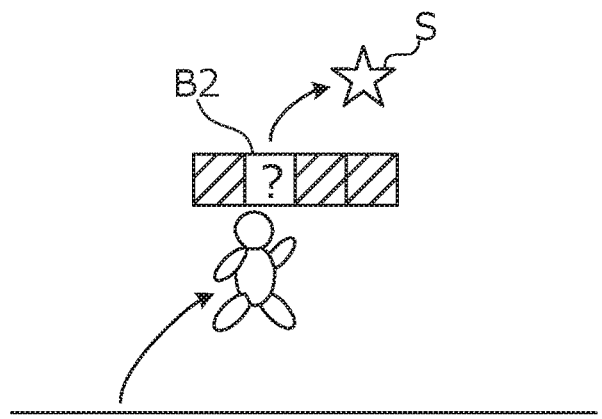
FIG. 7 is a diagram showing an example of a predetermined action of a player character.
FIG. 8 is a diagram showing an example of appearance right data D5.
FIG. 9 is a diagram showing an example of item management data D6.

As shown in FIG. 6, first player character P1 and second player character P2 are arranged in a game course. In addition, blocks B1 to B7 and enemy character E are arranged as parts. As shown in FIG. 7, when a player character performs a predetermined action on block B2, item S is caused to emerge from the block.

Operation data D2 is data on operations performed by players participating in a multi-player game. Operation data D2 is periodically updated to the latest data. Operation data D2 of other players is obtained from other game systems 1 via communication network 20.

Character data D3 is data indicative of positions and states of player characters and enemy characters present in a game course that is currently being played. Character data D3 is periodically updated to the latest data.

Part data D4 is data indicative of states of blocks and items present in a game course that is currently being played. Part data D4 is periodically updated to the latest data.

Appearance right data D5 is data indicative of existence or non-existence of appearance rights of players for item appearance areas present in a game course that is currently being played. An appearance right herein refers to a right to cause an item to appear in an item appearance area. An appearance right is managed for each player and for each item appearance area. FIG. 8 is a diagram showing an example of appearance right data D5. According to appearance right data D5 shown in the drawing, as for item appearance area A1, players P2 and P3 have an appearance right, and player P1 does not have an appearance right. Player P4 is excluded from management of appearance rights because s/he has dropped out of playing the game course. It is of note that the initial value of an appearance right is "true."

Item management data D6 is data relevant to items present in a game course that is currently being played. Specifically, item management data D6 is data indicative of sets of an appearance area of an item, a player who has caused the item to appear, and a holder of the item. Among data items, a data item "holder" is used mainly to manage a lifetime of a ride-on item. When a player holding a ride-on item causes his/her character to die, the ride-on item held by the player disappears after a predetermined period of time. FIG. 9 is a diagram showing an example of item management data D6. According to item management data D6 shown in the drawing, item T1 is caused to appear in item appearance area A1 by player P1, and is held by player P2.

Evaluation value data D7 is data indicative of evaluation values (or rate values) of players participating in a multi-player game. An evaluation value increases when a player wins a multi-player game, and decreases when the player loses a multi-player game.

The foregoing is a description of data storage area 2032.

Figure 10:
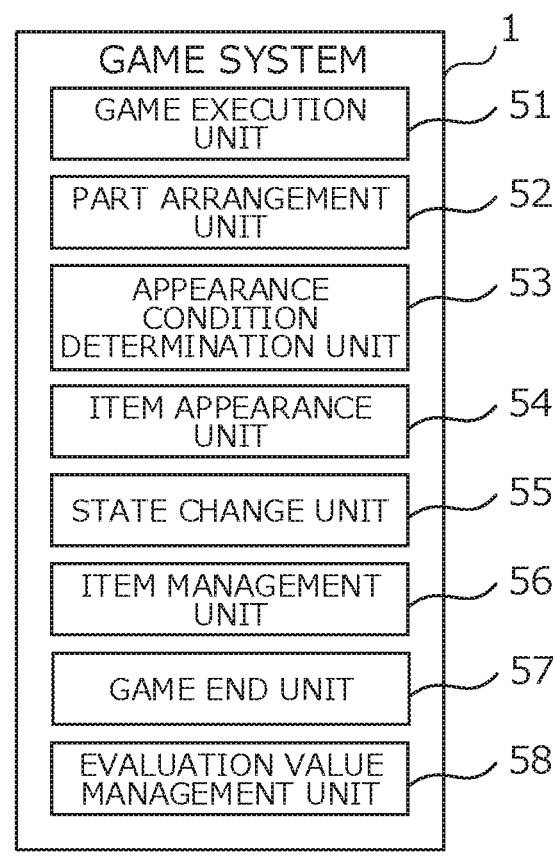
FIG. 10 is a block diagram showing an example of a functional configuration of game system 1.

When game program P loaded into program storage area 2031 is executed by processor 201, functions of game execution unit 51, part arrangement unit 52, appearance condition determination unit 53, item appearance unit 54, state change unit 55, item management unit 56, game end unit 57, and evaluation value management unit 58 are provided, as shown in FIG. 10. Below, each of the functions will be described in order.

Game execution unit 51 executes a multi-player game. Specifically, game execution unit 51 updates character data D3 and part data D4 based on operation data D2, to render a screen based on the updated data to be shown on display 211.

Part arrangement unit 52 arranges parts in a game space based on course data D1 at the start of a play of a game course. Specifically, part arrangement unit 52 arranges blocks, items, and enemy characters. When doing so, part arrangement unit 52 may overlap an item with a block so that the item is included in the block. The block overlapping the item is an item appearance area. Part arrangement unit 52 may also arrange an item directly in an area of a game space, without overlapping the item with a block. The area in which the item is directly arranged will be referred to as "come-up area." When a character enters a predetermined range from the come-up area, the item is caused to appear. The come-up area is an item appearance area.

Appearance condition determination unit 53, when a predetermined action is performed on an item appearance area, refers to data stored in data storage area 2032 to determine whether an item appearance condition is satisfied. A method of the determination differs depending on whether an item appearance area is a block or a come-up area. In a case where the item appearance area is a block, a method of the determination differs depending on whether an item that will appear belongs to a group of a power-up item and a ride-on item, or a group of a block conversion switch and a shake item. In a case where the item appearance area is a block, a method of the determination also differs depending on whether the predetermined action has been performed by a player character participating in a multi-player game, or by an enemy character. Below, a determination method used when a player performs a predetermined action on a block including a power-up item or a ride-on item will be described as a first determination method. A determination method used when a player performs a predetermined action on a block including a block conversion switch or a shake item, instead of a power-up item or a ride-on item, will be described as a second determination method. A determination method used when an enemy character, instead of a player, performs a predetermined action on a block including an item will be described as a third determination method. Finally, a determination method used when a player performs a predetermined action on a come-up area, instead of a block, will be described as a fourth determination method.

In the first determination method, when a player performs a predetermined action on a block including a power-up item or a ride-on item, it is determined whether a right state of the player concerning emergence of an item from the block is a first state. When the right state is the first state, it is determined that an item appearance condition is satisfied. On the other hand, when the right state is a second state, it is determined that an item appearance condition is not satisfied. The predetermined action refers to an action such as hitting, stepping on, throwing an item at, or passing the block. The right state being the first state refers to a situation where a value of an appearance right is "true." The right state being the second state refers to a situation where a value of an appearance right is "false."

In the second determination method, when a player performs a predetermined action on a block including a block conversion switch or a shake item, it is determined whether a right state of the player concerning emergence of an item from the block is a first state, and whether an area state for the block is a first area state. When the right state is the first state, and the area state is the first area state, it is determined that an item appearance condition is satisfied. On the other hand, when the right state is a second state, or when the area state is a second area state, it is determined that an item appearance condition is not satisfied. The predetermined action refers to an action such as hitting, stepping on, throwing a part at, or passing the block. The right state being the first state refers to a situation where a value of an appearance right is "true." The right state being the second state refers to a situation where a value of an appearance right is "false." The area state being the first area state refers to a situation where an item that has emerged from the block is not included in item management data D6 (in other words, a situation where an item that has emerged from the block is not present in the game course). The area state being the second area state refers to a situation where an item that has emerged from the block is included in item management data D6 (in other words, a situation where an item that has emerged from the block is present in the game course). The block conversion switch or the shake item do not reemerge from the block unless the same item that has emerged from the block disappears from the game course.

In the third determination method, when an enemy character performs a predetermined action on a block, it is determined whether a right state of a selected player concerning emergence of an item from the block is a first state, and whether an area state for the block is a first area state. When the right state is the first state, and the area state is the first area state, it is determined that an item appearance condition is satisfied. On the other hand, when the right state is a second state, or when the area state is a second area state, it is determined that an item appearance condition is not satisfied. The enemy character is an example of a non-player character including a moving part. The predetermined action refers to an action such as hitting, stepping on, throwing a part at, or passing the block. The selected player refers to a player who is present within a predetermined range from the block, who is closest to the block among players whose right state is the first state. The right state being the first state refers to a situation where a value of an appearance right is "true." The right state being the second state refers to a situation where a value of an appearance right is "false." The area state being the first area state refers to a situation where an item that has emerged from the block is not included in item management data D6. The area state being the second area state refers to a situation where an item that has emerged from the block is included in item management data D6. The item caused to appear by the enemy character does not reemerge from the block unless the same item that has emerged from the block disappears from the game course.

Lastly, in the fourth determination method, when a player performs a predetermined action on a come-up area, it is determined whether a right state of the player concerning appearance of an item in the come-up area is a first state, and whether an area state for the come-up area is a first area state. When the right state is the first state, and the area state is the first area state, it is determined that an item appearance condition is satisfied. On the other hand, when the right state is a second state, or when the area state is a second area state, it is determined that an item appearance condition is not satisfied. The predetermined action refers to approaching the come-up area. The right state being the first state refers to a situation where a value of an appearance right is "true." The right state being the second state refers to a situation where a value of an appearance right is "false." The area state being the first area state refers to a situation where an item that has appeared in the come-up area is not included in item management data D6, and a predetermined period of time has passed since an item last appeared in the come-up area. The area state being the second area state refers to a situation where an item that has appeared in the come-up area is included in item management data D6, or a predetermined period of time has not passed since an item last appeared in the come-up area.

Item appearance unit 54, when appearance condition determination unit 53 determines that an item appearance condition is satisfied, updates part data D4 to cause an item to appear in a game course. The item is caused to appear in an item appearance area on which a predetermined action has been performed. The predetermined action refers to touching (e.g., hitting) in a case where the item appearance area is a block, and to approaching (specifically, moving to a position such that the item appearance area appears on the screen) in a case where the item appearance area is a come-up area.

An appearance right for each player is lost if it is exercised; accordingly, the number of items that appear in an item appearance area is limited according to the number of participating players. For example, if an appearance right for a block is lost by causing N (natural number) number of items to emerge from the block, the number of items that emerge from the block comes to a value obtained by multiplying the number of participating players by N. Item appearance unit 54 keeps causing items of the same type to appear until the number of items that have appeared reaches an upper limit. If the number of items that have appeared reaches the upper limit (in other words, if values of appearance rights of all participating players except players who have dropped out of playing change to "false"), item appearance unit 54 updates part data D4 to change an appearance of the item appearance area. Specifically, item appearance unit 54 changes a block indicated by a question mark to an empty block.

Item appearance unit 54, when having caused an item to appear in an item appearance area in response to a predetermined action performed by an enemy character, refrains from causing another item to appear in the item appearance area until the item that has appeared disappears from the game course, if the predetermined action is performed again by the enemy character on the item appearance area. This is because an area state is considered when appearance condition determination unit 53 performs an appearance condition determination.

State change unit 55, after item appearance unit 54 causes an item to appear in an item appearance area, changes a right state of a player for the item appearance area to a second state. Changing a right state to the second state refers to changing a value of an appearance right to "false." When changing the right state, in a case where the item is caused to appear in response to a predetermined action performed by a player on an item appearance area, state change unit 55 changes a value of an appearance right for the player to "false." In a case where the item is caused to appear in response to a predetermined action performed by an enemy character on a block, state change unit 55 changes a value of an appearance right for a selected player to "false." The selected player refers to a player who is present within a predetermined range from the block, who is closest to the block among players whose appearance right value is "true."

State change unit 55, when a first player causes an item to appear in an item appearance area and thereafter a second player different from the first player performs a predetermined action (specifically, intercepting) on the item that has appeared, exchanges right states for the item appearance area between the first player and the second player. The predetermined action refers to an acquisition (specifically, holding, riding, or wearing) or a use (specifically, use of a block conversion switch or a shake item). Exchanging right states refers to exchanging values of appearance rights. For example, in a case where a value of an appearance right for the first player is "false" and a value of an appearance right for the second player is "true," as a result of an exchange of the values, a value for the first player changes to "true" and the value for the second player changes to "false." In other words, the appearance right for the first player is restored, and the appearance right for the second player is lost. As another example, in a case where a value of an appearance right for the first player is "false" and a value of an appearance right for the second player is "false," as a result of an exchange of the values, values for the two players do not change. In other words, the appearance right for the first player is not restored.

State change unit 55, when a second player rides (or intercepts) a first ride-on item whose holder is a first player, and a second ride-on item whose holder is the second player, and which has appeared in the same item appearance area as that of the first ride-on item, is not present in a game course, changes a right state for the first player relative to the item appearance area to a first state. Specifically, state change unit 55 changes a value of an appearance right for the first player to "true."

State change unit 55, when a player's progress of the game in a game course is reset, resets a right state for the player. Resetting a right state refers to changing a value of an appearance right for the player to "true." Resetting a progress of the game refers to returning a position and a state of a player character to an initial setting. Returning a position to an initial setting refers to returning the player character to a start point (or a halfway point in a game course in which such a halfway point is set). Returning a state to an initial setting refers to cancelling effects of items acquired by the player character.

However, when the player whose progress of the game has been reset is a holder of a ride-on item, and the ride-on item is present in the game course, state change unit 55 refrains from resetting a right state for an item appearance area in which the ride-on item has appeared.

State change unit 55 excludes a player who has dropped out of playing a game course from management of appearance rights.

Item management unit 56, after item appearance unit 54 causes an item to appear, stores item management data D6 on the item, indicative of sets of: an appearance area of the item; a player who has caused the item to appear; and a holder of the item. When doing so, in a case where the item appearance area of the item is a block, item management unit 56 registers the player who has caused the item to appear, as the holder. In a case where the item appearance area of the item is a come-up area, item management unit 56 registers no holder. This is because in a case where a come-up area is set near a place where all players gather, such as a start point, it is unclear to which player an item that has appeared in the come-up area belongs.

Item management unit 56, when an item present in a game course is subjected to a predetermined action performed by a player who is not a holder of the item, registers the player as the holder of the item. The predetermined action refers to an acquisition or riding (in a case where the item is a ride-on item).

Item management unit 56, when an item present in a game course becomes unattainable to players in a predetermined appearance determination area, deletes item management data D6 of the item to conclude management of the item. The item for which management has been concluded will disappear from the game course. The predetermined appearance determination area refers to, for example, an entire game course or a partial area of a game course that is determined based on a position of an item appearance area (for example, a one-screen area including an item appearance area). A situation where the item has become unattainable to players refers to, for example, a situation where a player has acquired or used the item so that the item has disappeared from the game course.

Item management unit 56, when a progress of the game in a game course is reset, or a player drops out of playing a game course, deletes item management data D6 of an item of which the player is a holder to conclude management of the item. Resetting a progress of the game refers to returning a position and a state of a player character to an initial setting, as described above.

Game end unit 57, when one of game end conditions is satisfied for each of players participating in a multi-play of a game course, ends the multi-player game. The game end conditions include finishing a game course, failing to finish a game course after a predetermined number of attempts (in other words, running out remaining lives), or dropping out of playing a game course.

Evaluation value management unit 58, after a multi-play of a game course ends, updates evaluation value data D7 of each player based on the player's performance. When doing so, evaluation value management unit 58 increases an evaluation value for a player who has finished the game course, and decreases an evaluation value for a player who has failed to finish the game course. If all players have failed to finish the game course, evaluation value management unit 58 does not increase or decrease their evaluation values.

1-2. Operation

Operations of game system 1 will be described. In the following, in particular, operations performed when an item is caused to appear, operations performed when a player acquires an item, and an operation performed when an item is used will be described.

1-2-1. Operations Performed when an Item is caused to Appear

Operations performed when an item is caused to appear includes three types of operations, namely an operation performed when a player causes an item to emerge from a block, an operation performed when an enemy character causes an item to emerge from a block, and an operation performed when a player causes an item to appear in a come-up area. Below, each of the operations will be described in order.

Figure 11:
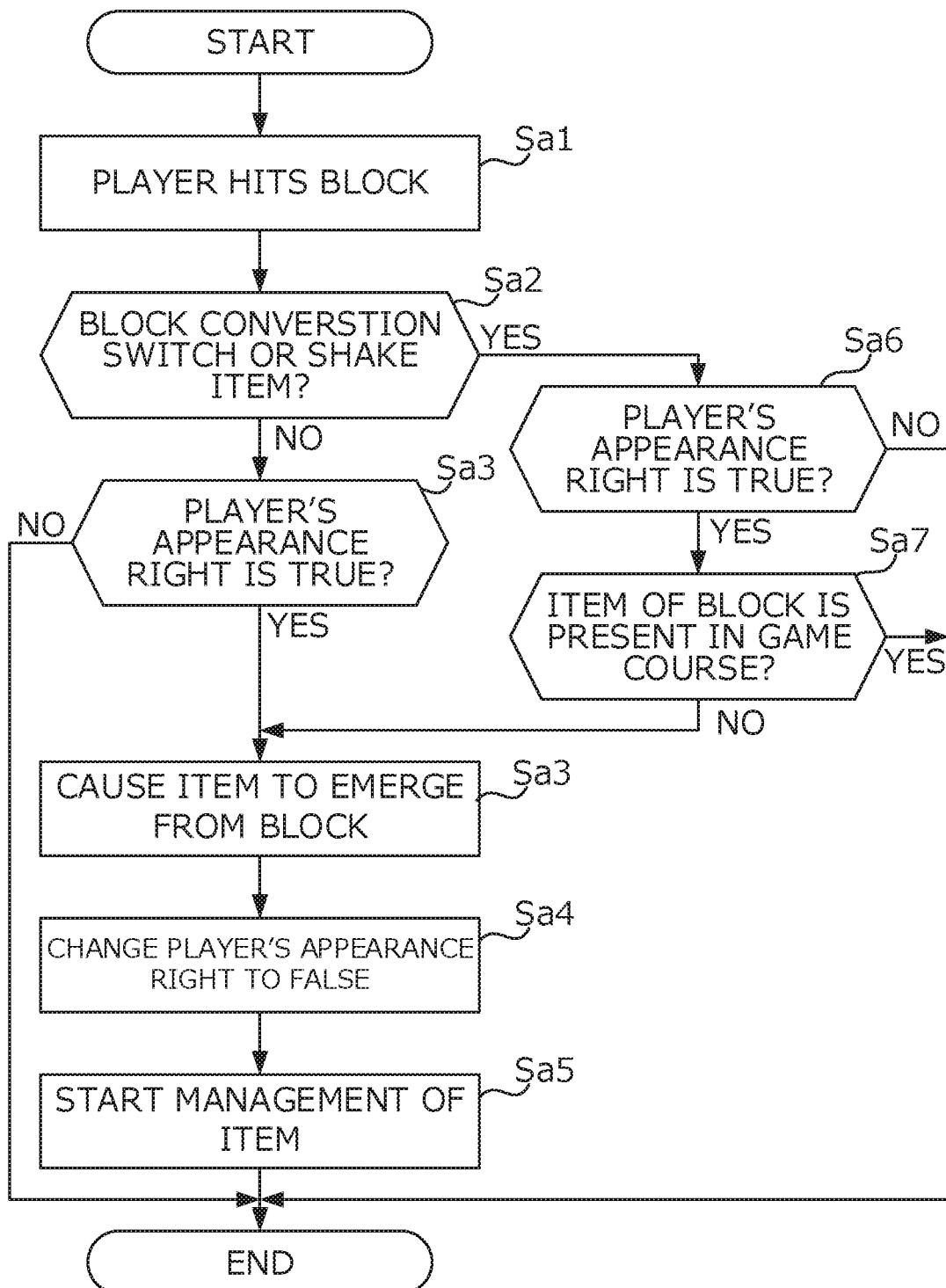
FIG. 11 is a flowchart showing an example of an operation performed when a player causes an item to emerge from a block.

FIG. 11 is a flowchart showing an example of an operation performed when a player causes an item to emerge from a block.

When a player performs an action such as hitting a block (step Sa1), appearance condition determination unit 53 refers to part data D4 to determine whether an item to be caused to emerge from the block is a block conversion switch or a shake item (step Sa2). As a result of the determination, if the item is not a block conversion switch or a shake item (NO at step Sa2), appearance condition determination unit 53 determines whether the player's value of an appearance right for the block is "true" (step Sa3). As a result of the determination, if the player's value of the appearance right for the block is "true" (YES at step Sa3), appearance condition determination unit 53 determines that an item appearance condition is satisfied. After it is determined that an item appearance condition is satisfied, item appearance unit 54 updates part data D4 to cause an item to emerge from the block (step Sa4). After the item appears, state change unit 55 changes the player's value of the appearance right for the block from "true" to "false" (step Sa5). Also, item management unit 56 stores item management data D6 on the item (step Sa6). When doing so, item management unit 56 registers the player as a holder of the item.

As a result of the determination at step Sa3, if the player's value of the appearance right for the block is "false" (NO at step Sa3), appearance condition determination unit 53 determines that an item appearance condition is not satisfied. After it is determined that an item appearance condition is not satisfied, item appearance unit 54 refrains from causing an item to emerge from the block.

As a result of the determination at step Sa2, if the item is a block conversion switch or a shake item (YES at step Sa2), appearance condition determination unit 53 initially determines whether the player's value of the appearance right for the block is "true" (step Sa7). As a result of the determination, if the player's value of the appearance right for the block is "true" (YES at step Sa7), appearance condition determination unit 53 subsequently determines whether the item to be caused to emerge from the block is included in item management data D6 (step Sa8). In other words, appearance condition determination unit 53 determines whether the item is present in the game course. As a result of the determination, if the item is not included in item management data D6 (NO at step Sa8), appearance condition determination unit 53 determines that an item appearance condition is satisfied. After it is determined that an item appearance condition is satisfied, item appearance unit 54 updates part data D4 to cause the item to emerge from the block (step Sa4).

As a result of the determination at step Sa7, if the player's value of the appearance right for the block is "false" (NO at step Sa7), or as a result of the determination at step Sa8, if the item is included in item management data D6 (YES at step Sa8), appearance condition determination unit 53 determines that an item appearance condition is not satisfied. After it is determined that an item appearance condition is not satisfied, item appearance unit 54 refrains from causing the item to emerge from the block.

The foregoing is a description of an operation performed when a player causes an item to emerge from a block.

Figure 12:
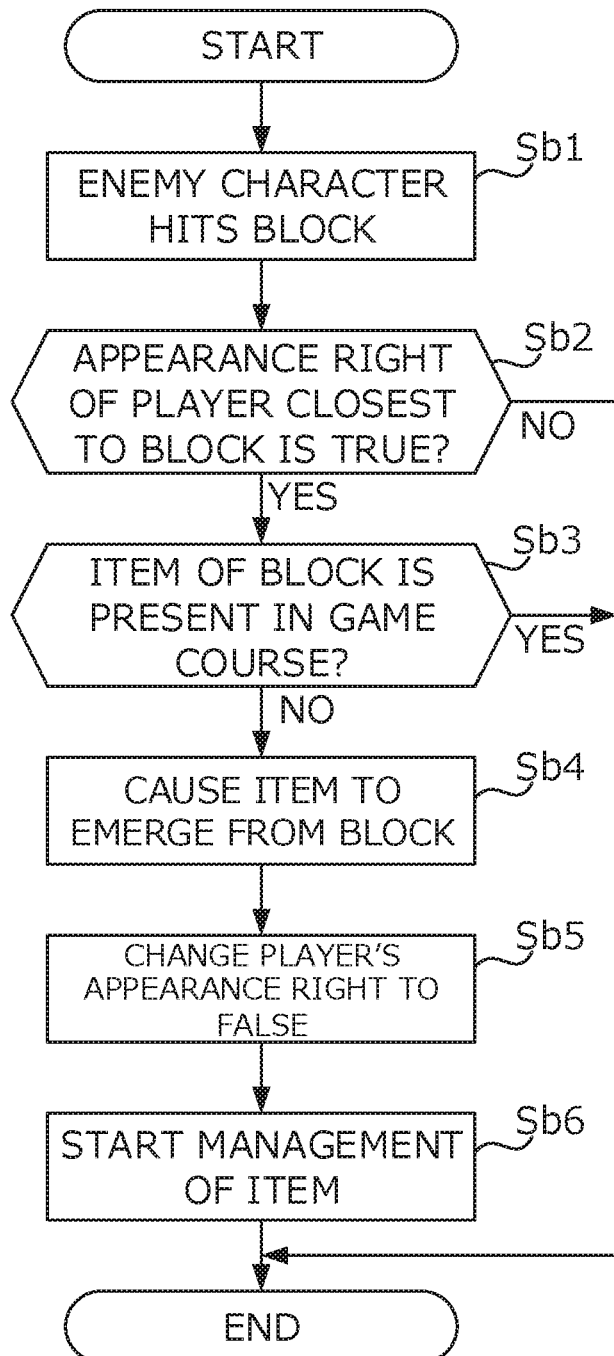
FIG. 12 is a flowchart showing an example of an operation performed when an enemy character causes an item to emerge from a block.

Now, FIG. 12 is a flowchart showing an example of an operation performed when an enemy character causes an item to emerge from a block.

When an enemy character performs an action such as hitting a block (step Sb1), appearance condition determination unit 53 refers to character data D3 and part data D4 to identify a player who is present within a predetermined range of the block, and is closest to the block, and determines whether the identified player's value of an appearance right for the block is "true" (step Sb2). As a result of the determination, if the identified player's value of the appearance right for the block is "true" (YES at step Sb2), appearance condition determination unit 53 determines whether an item to be caused to emerge from the block is included in item management data D6 (step Sb3). In other words, appearance condition determination unit 53 determines whether the item is present in the game course. As a result of the determination, if the item is not included in item management data D6 (NO at step Sb3), appearance condition determination unit 53 determines that an item appearance condition is satisfied. After it is determined that an item appearance condition is satisfied, item appearance unit 54 updates part data D4 to cause the item to emerge from the block (step Sb4). After the item appears, state change unit 55 changes the identified player's value of the appearance right for the block from "true" to "false" (step Sb5). Also, item management unit 56 stores item management data D6 on the item (step Sb6). When doing so, item management unit 56 registers no holder for the item.

As a result of the determination at step Sb2, if the player's value of the appearance right for the block is "false" (NO at step Sb2), or as a result of the determination at step Sb3, if the item is included in item management data D6 (YES at step Sb3), appearance condition determination unit 53 determines that an item appearance condition is not satisfied. After it is determined that an item appearance condition is not satisfied, item appearance unit 54 refrains from causing the item to emerge from the block.

The foregoing is a description of an operation performed when an enemy character causes an item to emerge from a block.

Figure 13:
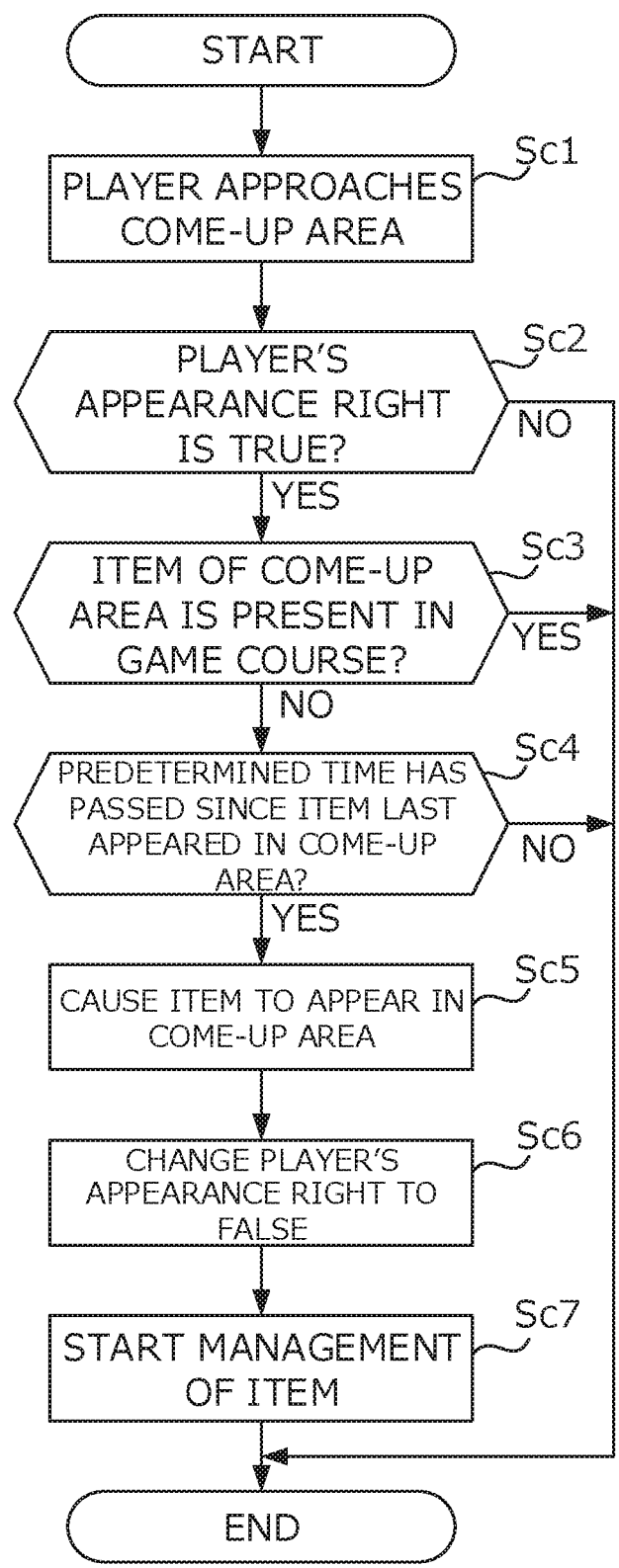
FIG. 13 is a flowchart showing an example of an operation performed when a player causes an item to appear in a come-up area.

Now, FIG. 13 is a flowchart showing an example of an operation performed when a player causes an item to appear in a come-up area.

When a player character approaches a come-up area (step Sc1), appearance condition determination unit 53 determines whether the player's value of an appearance right for the come-up area is "true" (step Sc2). As a result of the determination, if the player's value of the appearance right for the come-up area is "true" (YES at step Sc2), appearance condition determination unit 53 subsequently determines whether an item to be caused to appear in the come-up area is included in item management data D6 (step Sc3). In other words, appearance condition determination unit 53 determines whether the item is present in the game course. As a result of the determination, if the item is not included in item management data D6 (NO at step Sc3), appearance condition determination unit 53 determines whether a predetermined period of time has passed since an item last appeared in the come-up area (step Sc4). As a result of the determination, if the predetermined period of time has passed since an item last appeared in the come-up area (YES at step Sc4), appearance condition determination unit 53 determines that an item appearance condition is satisfied. After it is determined that an item appearance condition is satisfied, item appearance unit 54 updates part data D4 to cause the item to appear in the come-up area (step Sc5). After the item appears, state change unit 55 changes the identified player's value of the appearance right for the come-up area from "true" to "false" (step Sc6). Also, item management unit 56 stores item management data D6 on the item (step Sc7). When doing so, item management unit 56 registers no holder for the item.

As a result of the determination at step Sc2, if the player's value of the appearance right for the come-up area is "false" (NO at step Sc2), as a result of the determination at step Sc3, if the item is included in item management data D6 (YES at step Sc3), or as a result of the determination at step Sc4, if the predetermined period of time has not passed since an item last appeared in the come-up area (NO at step Sc4), appearance condition determination unit 53 determines that an item appearance condition is not satisfied. After it is determined that an item appearance condition is not satisfied, item appearance unit 54 refrains from causing the item to appear in the come-up area.

The foregoing is a description of an operation performed when a player causes an item to appear in a come-up area.

1-2-2. Operations Performed when a Player Acquires an Item

Operations performed when a player acquires an item includes three types of operations, namely an operation performed when a player acquires a power-up item, an operation performed when a player rides a ride-on item, and an operation performed when a player acquires a special item. The reason that a ride-on item is distinguished from other items is that a ride-on item has a feature that only a single player can ride a ride-on item, and after a player gets off a ride-on item, another player can ride the ride-on item. Below, each of the operations will be described in order.

Figure 14:
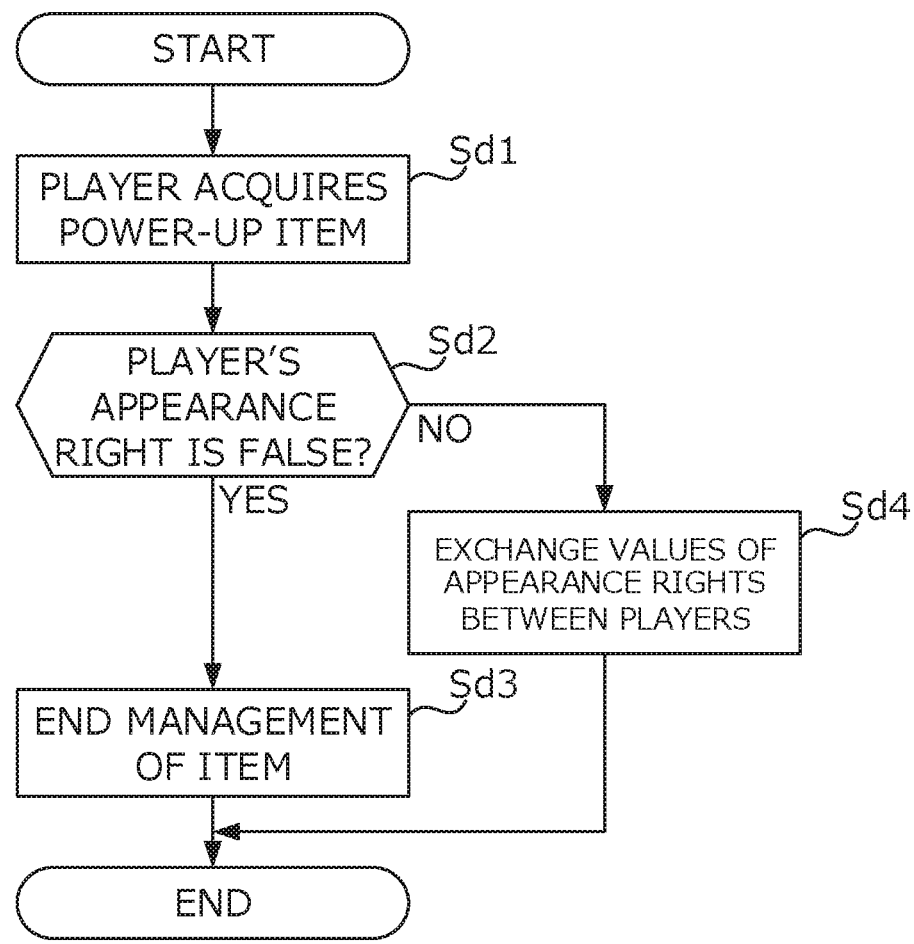
FIG. 14 is a flowchart showing an example of an operation performed when a player acquires a power-up item.

FIG. 14 is a flowchart showing an example of an operation performed when a player acquires a power-up item.

When a player acquires a power-up item (step Sd1), state change unit 55 determines whether the player's value of an appearance right for an item appearance area in which the item has appeared is "false" (step Sd2). As a result of the determination, if the player's value of the appearance right for the item appearance area is "false" (YES at step Sd2), item management unit 56 determines item management data D6 on the item to conclude management of the item (step Sd3). On the other hand, if the player's value of the appearance right for the item appearance area is "true" (in other words, if the player has intercepted the item, without losing his/her appearance right) (NO at step Sd2), state change unit 55 exchanges values of appearance rights between the player who has acquired the item and a player who has caused the item to appear (step Sd4). Subsequently, item management unit 56 determines item management data D6 on the item to conclude management of the item (step Sd3).

The foregoing is a description of an operation performed when a player acquires a power-up item.

Figure 15:
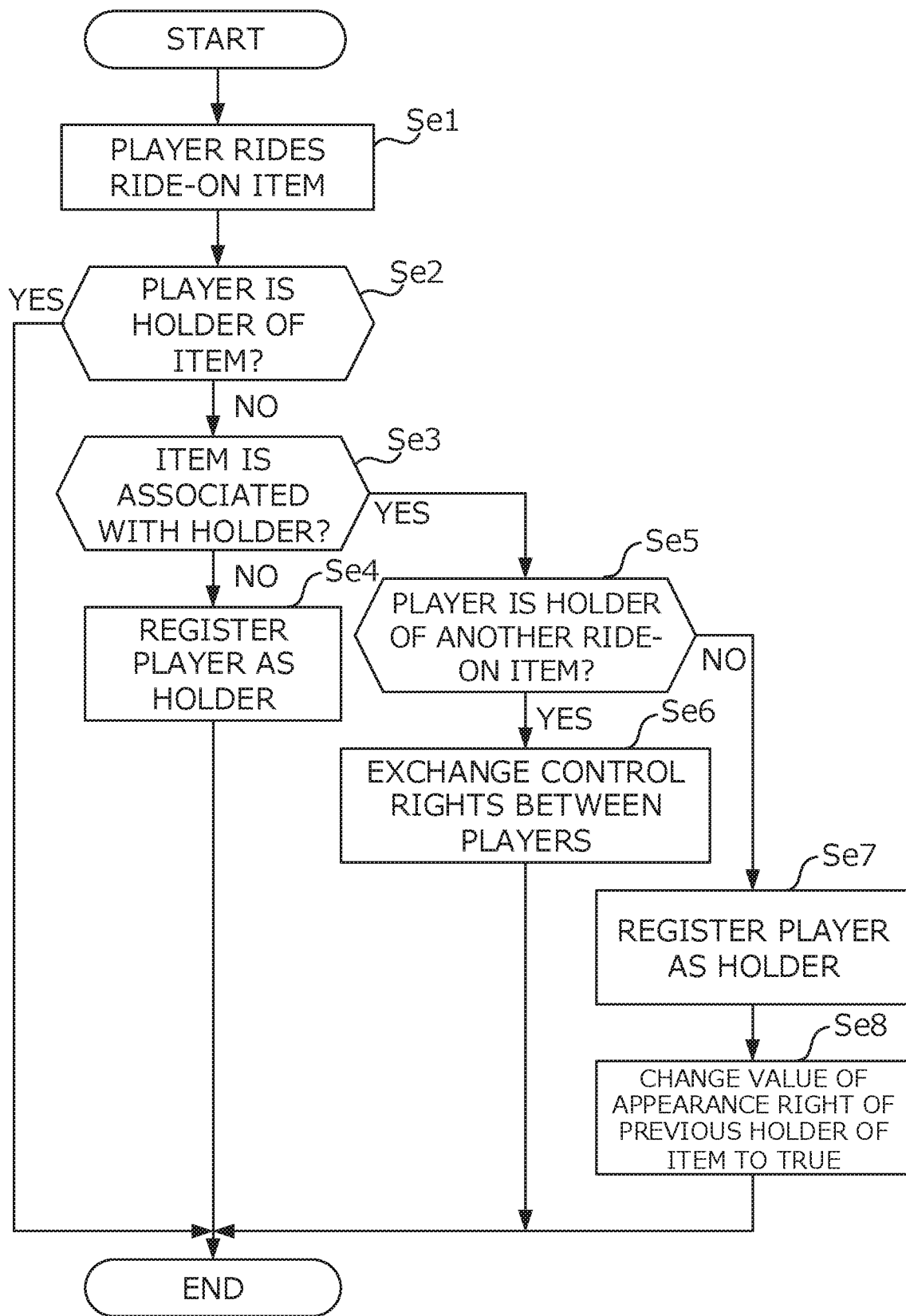
FIG. 15 is a flowchart showing an example of an operation performed when a player character rides a ride-on item.

Now, FIG. 15 is a flowchart showing an example of an operation performed when a player rides a ride-on item.

When a player rides a ride-on item (step Se1), item management unit 56 refers to item management data D6 to determine whether the player is a holder of the item (step Se2). As a result of the determination, if the player is a holder of the item (YES at step Se2), the present operation ends. On the other hand, if the player is not a holder of the item (in other words, if the player has intercepted the item) (NO at step Se2), item management unit 56 determines whether the item is associated with a holder (step Se3). As a result of the determination, if the item is not associated with a holder (NO at step Se3), item management unit 56 registers the player as a holder of the item (step Se4). On the other hand, if the item is associated with a holder (YES at step Se3), item management unit 56 determines whether the player is a holder of another item that has appeared in the same item appearance area as that of the item (step Se5). As a result of the determination, if the player is a holder of the other item (YES at step Se5), item management unit 56 exchanges control rights between the player and the holder of the item (Step Se6). Specifically, item management unit 56 registers the player as a new holder of the item, and registers the previous holder of the item as a holder of the other item of which the player is a holder. On the other hand, if the player is not a holder of the other item (NO at step Se5), item management unit 56 registers the player as a holder of the item (step Se7). Also, state change unit 55 changes the previous holder's value of an appearance right for the item appearance area to "true" (step Se8).

The foregoing is a description of an operation performed when a player rides a ride-on item.

As for an operation performed when a player acquires a special item, when a player acquires a special item, item management unit 56 registers the player as a holder of the item.

1-2-3. Operation Performed when an Item is used

Figure 16:
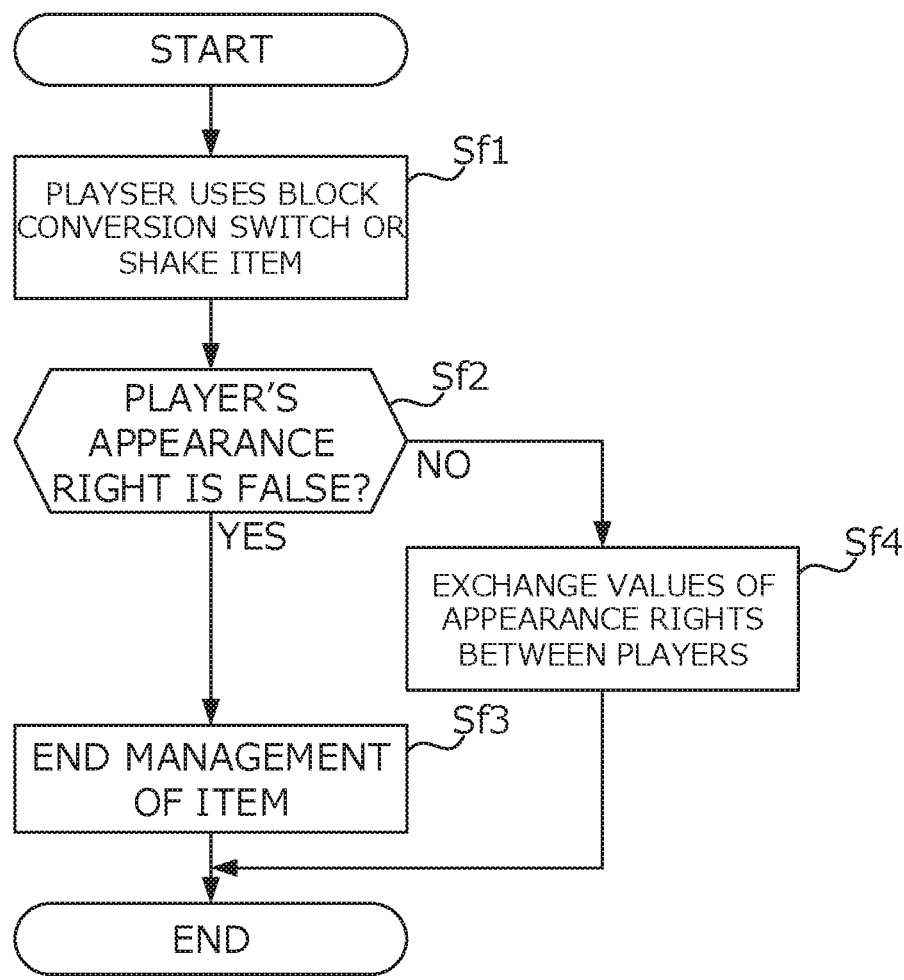
FIG. 16 is a flowchart showing an example of an operation performed when a player uses a block conversion switch or a shake item.

FIG. 16 is a flowchart showing an example of an operation performed when a player uses a block conversion switch or a shake item.

When a player uses a block conversion switch or a shake item (step Sf1), state change unit 55 determines whether the player's value of an appearance right for an item appearance area in which the used item has appeared is "false" (step Sf2). As a result of the determination, if the player's value of the appearance right for the item appearance area is "false" (YES at step Sf2), item management unit 56 deletes item management data D6 on the item to conclude management of the item (step Sf3). On the other hand, if the player's value of the appearance right for the item appearance area is "true" (NO at step Sf2), state change unit 55 exchanges values of appearance rights between the player and a player who has caused the item to appear (step Sf4). Subsequently, item management unit 56 deletes item management data D6 on the item to conclude management of the item (step Sf3).

The foregoing is a description of an operation performed when a player uses a block conversion switch or a shake item.

As described in the foregoing, in the game executed in the present embodiment, an appearance right is managed for each item appearance area; accordingly, a situation is avoided in which a single player causes plural items to appear in an item appearance area. In addition, if a player has his/her item intercepted, the player is helped by restoring of the player's appearance right.

2. Modifications

The above embodiment may be modified as described below. Two or more of the following modifications may be combined with each other.

2-1. Modification 1

Game system 1 is an example of an information-processing device capable of executing game program P. Game program P may be executed in another information-processing device such as a smartphone or a PC. The functions provided by game program P may be distributed over networked information-processing devices.

2-2. Modification 2

A game provided by running game program P is not limited to a two-dimensional horizontal-scrolling action game, and may be a three-dimensional action game, for example.

2-3. Modification 3

Course data D1 may not necessarily be created by a player of game system 1, and may be created by a game development company.

2-4. Modification 4

An item placed at a come-up area is caused to appear if a player character approaches the come-up area, as described above. However, as for a first item that appears in the come-up area, the item may be present at the come-up area from the start of the game.

2-5. Modification 5

Appearance condition determination unit 53, when an enemy character performs a predetermined action on a block, may refer to a value of an appearance right of a player having a highest evaluation value or a most advantageous status, instead of a player closest to the block, to determine whether an item appearance condition is satisfied. In that case, if an item appearance condition is satisfied so that an item is caused to appear, state change unit 55 changes the value of the appearance right of the player having a highest evaluation value or a most advantageous status to "false."

2-6. Modification 6

Item appearance unit 54, when a predetermined action is performed on an item appearance area, may cause an item to appear in a place other than the item appearance area. For example, item appearance unit 54 may cause an item to fall from the top of the screen.

Item appearance unit 54, when a predetermined action is performed on an item appearance area, may not necessarily cause an item of the same type to appear. For example, each time a predetermined action is performed, item appearance unit 54 may cause an item having a same effect and a different appearance (e.g., color or shape) to appear. As another example, item appearance unit 54 may cause an item having a different effect and appearance to appear.

Item appearance unit 54, when a player has lost his/her appearance right for an item appearance area while other players retain their appearance rights for the item appearance area, may change an appearance of the item appearance area. Specifically, an appearance of the item appearance area may be changed only on the player's screen while an appearance of the item appearance area may be maintained on the other player's screens.

An upper limit of items that can appear in an item appearance area may be set to be a multiple of the number of participating players. For example, in a case where the number of participating players is four, an upper limit may be set to eight so that each player has two appearance rights.

When a player performs a predetermined action on an item appearance area, and an item appearance condition is satisfied, an item may not be caused to appear; however, the player may be given an effect of the item. Specifically, the moment a player character hits a block, the player character may be given increased strength.

2-7. Modification 7

State change unit 55, when a first player causes an item to appear and thereafter a second player different from the first player performs a predetermined action on the item that has appeared, may change the first player's value of an appearance right to "true," instead of exchanging values of appearance rights between the first player and the second player.

2-8. Modification 8

As a block arranged in a game course, a transparent block may be used. A transparent block is a block that is made visible if a character performs a predetermined action on the block. A transparent block can include an item.

What is claimed is:

1. A non-transitory computer readable storage medium having stored therein instructions executable by one or more computer processors of an information processing apparatus, the instructions, when executed, causing the one or more computer processors to perform operations comprising:
running a game played by players;
arranging an item appearance area in a virtual game space of the game;
upon detecting that a first player object performs a first action on the item appearance area, determining whether a right state of the first player object concerning appearance of a game item in the item appearance area is a first state or a second state, and whether an area state of the item appearance area is a first area state or a second area state;
upon determining that the right state is the first state and the area state is the first area state, determining that an item appearance condition is satisfied;
upon determining that the right state is the second state or the area state is the second area state, determining that an item appearance condition is not satisfied;
upon determining that the item appearance condition is satisfied, causing the game item to appear in the virtual game space;
upon detecting the first action performed by the first player object on the item appearance area or a second action performed by the first player object on the game item, changing the right state of the first player object for the item appearance area to the second state; and
upon detecting that the game item becomes unattainable by player objects in an appearance determination area within the virtual game space, changing the area state to the first area state.

2. The non-transitory storage medium according to claim 1, wherein after the right state of the first player object for the item appearance area is changed to the second state, upon detecting that a second player object other than the first player object performs the second action on the game item, the right state of the first player object for the item appearance area is exchanged with a right state of the second player object for the item appearance area.

3. The non-transitory storage medium according to claim 1, wherein after the right state of the first player object for the item appearance area is changed to the second state, upon detecting that a second player object other than the first player object performs the second action on the game item, and that the right state of the second player object is the first state, the right state of the first player object is changed to the first state.

4. The non-transitory storage medium according to claim 1, wherein after the right state of the first player object for the item appearance area is changed to the second state, upon detecting that a second player object other than the first player object performs the second action on the game item, the right state of the first player object is changed to the first state.

5. The non-transitory storage medium according to claim 2, wherein upon detecting that the second player object acquires or uses the game item as the second action, the right state of the first player object is changed to the first state.

6. The non-transitory storage medium according to claim 1, wherein upon detecting that the first player object touches or approaches the item appearance area as the first action, the game item is caused to appear in the virtual game space.

7. The non-transitory storage medium according to claim 1, wherein an upper limit number of game items that appear in response to the first action on the item appearance area is set to a multiple of a number of players participating in the game.

8. The non-transitory storage medium according to claim 1, wherein upon detecting that the game item disappears from the appearance determination area, the area state is changed to the first area state.

9. The non-transitory storage medium according to claim 1, wherein upon detecting that the first player object acquires the game item so that the game item disappears from the appearance determination area, the area state is changed to the first state.

10. The non-transitory storage medium according to claim 1, wherein upon detecting the first action on the item appearance area, another game item of a same type as the game item is caused to appear in the virtual game space.

11. The non-transitory storage medium according to claim 1, wherein the game item is caused to appear in response to the first action on the item appearance area.

12. The non-transitory storage medium according to claim 1, wherein upon detecting that the first player object's progress of the game in the virtual game space is reset, the right state of the first player object is reset.

13. The non-transitory storage medium according to claim 1, wherein upon detecting that a player operating the first player object drops out of playing the game in the virtual game space, an upper limit number of game items that appear in response to the first action on the item appearance area is decreased.

14. The non-transitory storage medium according to claim 1, wherein upon detecting that the first player object performs the second action on the game item, the first player object is associated with the game item.

15. The non-transitory storage medium according to claim 14, wherein upon detecting that the first player object's progress of the game in the virtual game space is reset, and that the game item associated with the first player object is present in the virtual game space, the game item is deleted from the virtual game space.

16. The non-transitory storage medium according to claim 14, wherein the game item is a ride-on item that the first player object can ride.

17. The non-transitory storage medium according to claim 1, wherein:
   a position of the item appearance area in the virtual game space and a type of the game item are determined by a user; and
   a number of game items that are caused to appear in response to the first action on the item appearance area is changed, in accordance with a number of players playing the game.

18. An information-processing device comprising:
   memory; and
   at least one processor configured to at least:
      run a game played by players;
      arrange an item appearance area in a virtual game space of the game;
      upon detecting that a first player object performs a first action on the item appearance area, determine whether a right state of the first player object concerning appearance of a game item in the item appearance area is a first state or a second state, and whether an area state of the item appearance area is a first area state or a second area state;
      upon determining that the right state is the first state and the area state is the first area state, determine that an item appearance condition is satisfied;
      upon determining that the right state is the second state or the area state is the second area state, determine that an item appearance condition is not satisfied;
      upon determining that the item appearance condition is satisfied, cause the game item to appear in the virtual game space;
      upon detecting the first action performed by the first player object on the item appearance area or a second action performed by the first player object on the game item, change the right state of the first player object for the item appearance area to the second state; and
      upon detecting that the game item becomes unattainable by the first player object in an appearance determination area within the virtual game space, change the area state to the first area state.

19. An information-processing system comprising:
   memory; and
   at least one processor configured to at least:
      run a game played by players;
      arrange an item appearance area in a virtual game space of the game;
      upon detecting that a first player object performs a first action on the item appearance area, determine whether a right state of the first player object concerning appearance of a game item in the item appearance area is a first state or a second state, and whether an area state of the item appearance area is a first area state or a second area state;
      upon determining that the right state is the first state and the area state is the first area state, determine that an item appearance condition is satisfied;
      upon determining that the right state is the second state or the area state is the second area state, determine that an item appearance condition is not satisfied;
      upon determining that the item appearance condition is satisfied, cause the game item to appear in the virtual game space;
      upon detecting the first action performed by the first player object on the item appearance area or a second action performed by the first player object on the game item, change the right state of the first player object for the item appearance area to the second state; and
      upon detecting that the game item becomes unattainable by the first player object in an appearance determination area within the virtual game space, change the area state to the first area state.

20. An information-processing method for use with an information processing device comprising at least one processor and a memory, the memory storing instructions executable by the at least one processor to perform method steps, the method comprising:
   running a game played by players, using the least one processor of the information-processing device;
   arranging an item appearance area in a virtual game space of the game, using the at least one processor;
   upon detecting that a first player object performs a first action on the item appearance area, determining using the at least one processor whether a right state of the first player object concerning appearance of a game item in the item appearance area is a first state or a second state, and whether an area state of the item appearance area is a first area state or a second area state;

upon determining that the right state is the first state and the area state is the first area state, determining using the at least one processor that an item appearance condition is satisfied;

upon determining that the right state is the second state or the area state is the second area state, determining using the at least one processor that an item appearance condition is not satisfied;

upon determining that the item appearance condition is satisfied, causing the game item to appear in the virtual game space using the at least one processor;

upon detecting the first action performed by the first player object on the item appearance area or a second action performed by the first player object on the game item, changing the right state of the first player object for the item appearance area to the second state using the at least one processor; and upon detecting that the game item becomes unattainable by the first player object in an appearance determination area within the virtual game space, changing the area state to the first area state using the at least one processor.

* * * * *